United States Patent [19]
Ross

[11] Patent Number: 5,316,152
[45] Date of Patent: May 31, 1994

[54] HIGH RISE RECYCLING SYSTEM

[76] Inventor: James A. Ross, 1891 W. Rowley Rd., Plainfield, Ill. 60544

[21] Appl. No.: 909,491

[22] Filed: Jul. 6, 1992

[51] Int. Cl.⁵ .............................................. B07C 5/36
[52] U.S. Cl. .................................. 209/630; 209/655; 209/706; 209/908; 209/930; 209/934; 209/942
[58] Field of Search .......................... 232/43.1–43.3, 232/44; 209/629, 630, 655, 657, 692, 693, 706, 908, 930, 934, 942

[56] References Cited

U.S. PATENT DOCUMENTS

| | | |
|---|---|---|
| 2,354,419 | 7/1944 | Lingerfelt et al. ............... 209/630 |
| 2,377,619 | 6/1945 | Ernst ................................. 209/630 |
| 2,396,553 | 3/1946 | Ciruli ................................. 209/630 |
| 3,268,073 | 8/1966 | Lehde et al. ...................... 209/629 |
| 4,254,876 | 3/1981 | Flores-Verdugo et al. ...... 209/657 |
| 4,281,764 | 8/1981 | Fowler, Jr. ....................... 209/657 |
| 4,373,435 | 2/1983 | Grevich ............................ 209/930 |
| 4,387,064 | 6/1983 | Werderitch et al. ............. 209/657 |
| 4,987,988 | 1/1991 | Messina et al. .................. 209/655 |
| 4,995,765 | 2/1991 | Tokuhiro et al. ................ 209/930 |
| 5,031,829 | 7/1991 | Shantzis ........................... 209/706 |
| 5,116,486 | 5/1992 | Pederson .......................... 209/630 |
| 5,143,308 | 9/1992 | Hally et al. ....................... 209/630 |

FOREIGN PATENT DOCUMENTS

| | | | |
|---|---|---|---|
| 2407482 | 8/1975 | Fed. Rep. of Germany ........ 232/44 |
| 1426236 | 5/1966 | France ................................ 232/44 |
| 2371357 | 7/1978 | France ................................ 209/930 |
| 117879 | 1/1970 | Norway ............................... 209/655 |
| 73174518 | 9/1976 | Sweden ............................... 209/655 |
| 781300 | 11/1980 | U.S.S.R. .............................. 232/44 |
| 825758 | 12/1959 | United Kingdom ................. 232/44 |
| 90/08714 | 8/1990 | World Int. Prop. O. ........... 209/706 |

*Primary Examiner*—D. Glenn Dayoan
*Attorney, Agent, or Firm*—Ernest Kettelson

[57] ABSTRACT

A high rise recycling system for a multi-story building comprises a vertical chute extending from the bottom to top floor, discharge openings on each floor, a rotatable chute at the lower end to discharge garbage into a compactor and to discharge recyclable glass, paper, aluminum and plastic into a selective discharge assembly which selectively discharges each of the separate items into respective containers for such separate items. A control circuit having control switches on each floor controls operation of the selective discharge assembly. A power circuit drives a conveyor belt which carries the recyclable items through the selective discharge assembly to their respective discharge outlets for deposit into their respective containers.

16 Claims, 9 Drawing Sheets

HIGH RISE RECYCLING SYSTEM

BACKGROUND OF THE INVENTION

This invention relates to the field of disposal systems in multi-story buildings to sort out different kinds of disposable items dropped therein and deliver them into separate receptacles for recycling or separate processing.

Examples of prior art disposal systems known to the inventor in this case include those disclosed in the following United States patents.

U.S. Pat. No. 5,031,829 discloses a separated waste collection system for a multi-story building having a vertical chute which extends to all floors, discharge openings on each floor, and a turntable positioned below the chute opening at the bottom with five separate receptacles thereon. A control system operable from each floor rotates the turn-table to position a selected receptacle under the chute which has been designated to receive a particular kind of disposable material. A microprocessor controller and interlocks on the access doors prevent conflicts between floors.

U.S. Pat. No. 4,987,988 discloses a refuse recycler which separates and collects specific varieties of trash in exterior trash cans through the use of a plurality of ducts or chutes leading to a corresponding plurality of receiving trash receptacles.

U.S. Pat. No. 4,847,927 discloses a garbage collection device for a sink unit which provides for separating different kinds of garbage, below which are several waste containers to receive the different types of sorted out garbage when dropped into the unit after being positioned to direct such sorted out garbage into the desired waste container.

U.S. Pat. No. 3,661,255 discloses a sorting apparatus having three containers to receive three different sorted out items, and deflecting partitions thereabove controlled by an electrical control circuit and controller whereby the partitions are manipulated to direct particular ones of the items deposited in the sorter into particular ones of the three containers.

U.S. Pat. No. 3,655,039 discloses a separating device for separating metallic matter from non-metallic matter comprising a movable funnel shaped hopper normally biased to a position for discharge of non-metallic materials into a corresponding opening for such materials and a metal-detecting sensor and operating mechanism that deflects the hopper to discharge any metal items sensed into a different opening or receptacle to receive such metal items.

U.S. Pat. No. 3,388,795 discloses a method and apparatus for selectively removing and sorting components from a mass of components such as diodes which are spatially suspended in a magnetic field. A magnetic pick up member is then inserted into such mass of components suspended in the magnetic field to withdraw a predetermined number for subsequent testing and sorting.

U.S. Pat. No. 3,198,330 discloses an automatic sorting machine for testing of electrical and electronic components such as diodes, comprising a machine which automatically feeds such components one by one to a testing station, a sensing device at the testing station which delivers an input signal as to characteristics of each component being tested to a distributing mechanism which directs the components having varying characteristics into appropriate receiving bins for such sorted out components.

U.S. Pat. No. 3,016,142 discloses a method and apparatus for distributing an article to one of several receiving locations, particularly carbon resistors used in the telephone industry. The invention includes a grid which can be reciprocated in the directions of the X and Y axis to sort the items into a corresponding group of receptacles in accordance with a measured physical characteristic of the items.

U.S. Pat. No. 2,382,168 discloses an apparatus for sorting granular material according to its moisture content comprising a conveyor for grain travelling at a predetermined speed, means to compress the stream of grain to a desired thickness while leaving it free to spread out laterally on the conveyor belt, electrodes in the path of the stream of grain which are connected in an electric circuit to sensing equipment for distinguishing successive portions of the continuing stream of grain in accordance with variations in the electrical properties of the grain passing between the electrodes due to variations in its moisture content.

The present invention is an improvement over prior art disposal systems for multi-story buildings by providing a separating mechanism for recyclable materials which extends in-line to convey whatever recyclable material is being disposed of from the upstream end of the separating mechanism in the downstream direction to the pre-designated discharge outlet for that particular recyclable material, the door for such discharge outlet opens inwardly of the conveyor path at an angle to intercept the particular recyclable material and direct it out through the pre-designated discharge outlet into a pre-designated receptacle positioned below. Such receptacles can set directly on the floor and are not moved until they have been filled. In some prior art disposal systems for multi-story buildings, the receptacles are mounted on turntables which have to be rotated into position under the high-rise chute for the particular material being disposed of. When the receptacles have to be rotated, there is always the risk they will be jolted out of position so the materials dropped down the chute will miss the intended receptacle. Also as the receptacles become filled they become heavier making it less certain that the rotating mechanism of the turn-table will be able to accurately place each receptacle under the chute to receive what is being dropped down. Such prior art systems also put great strain on the turn-table mechanism resulting in greater wear and risk of premature failure.

The specific embodiment of the present invention which is described and shown in this specification has four separate discharge outlets, a first one for glass, the next downstream for paper, the third downstream for aluminum and the fourth downstream for plastic. Since the separating mechanism in accordance with this invention is in-line, it can be made longer to provide for additional discharge outlets for additional types of disposable material.

This invention also includes an important feature which prevents throw-away garbage as such from being inadvertently conveyed into one of the receptacles intended only for recyclable material. It provides a rotatable spout at the bottom of the high-rise disposal chute which is rotated to discharge into the hopper of a compactor when someone on one of the floors presses the push-button for discharge of garbage. An over-ride control in the operating circuit makes it impossible for a person on a different floor to energize the mechanism which conveys and separates recyclable materials while the circuit for discharge of garbage is energized. It is only after the circuit for discharge of garbage has been opened and de-energized that the mechanism which conveys and separates recyclable materials can be energized. The spout then rotates away from the compactor hopper and into registration with the hopper of a completely different mechanism which conveys and directs recyclable materials through the pre-designated discharge openings and into their corresponding receptacles.

The invention also includes selective disabling circuitry in the control circuit which controls opening and closing of the respective discharge doors for the recyclable glass, paper, aluminum and plastic. When any one of such doors has been signalled to open by a person on one of the floors pressing the push-button switch for the particular kind of recyclable material he is disposing of down the hi-rise chute, none of the other discharge doors can be opened by a person on a different floor pressing the push-button for disposing of a different kind of recyclable material.

Other important features of this invention will become apparent from the detail description which follows and from the accompanying drawings.

SUMMARY OF THE INVENTION

It is an object of the invention to provide an improved disposal and recycling system for use in multi-story buildings, wherein the risk of garbage being inadvertently directed into receptacles intended for recyclable materials is reduced, and wherein the risk of one type of recyclable material being directed into receptacles intended for other types of recyclable materials is also reduced.

It is an object of the invention to provide an improved disposal and recycling system for use in multi-story buildings in which throw-away garbage is directed into the hopper of a compactor where it can be compacted into small bundles for easier haul away for disposal and in which recyclable materials are directed into an entirely different hopper and mechanism for conveying and directing through selected discharge openings into respective receptacles for each of the recyclable materials the system is set up to handle.

DESCRIPTION OF PREFERRED EMBODIMENT

Figure 1:
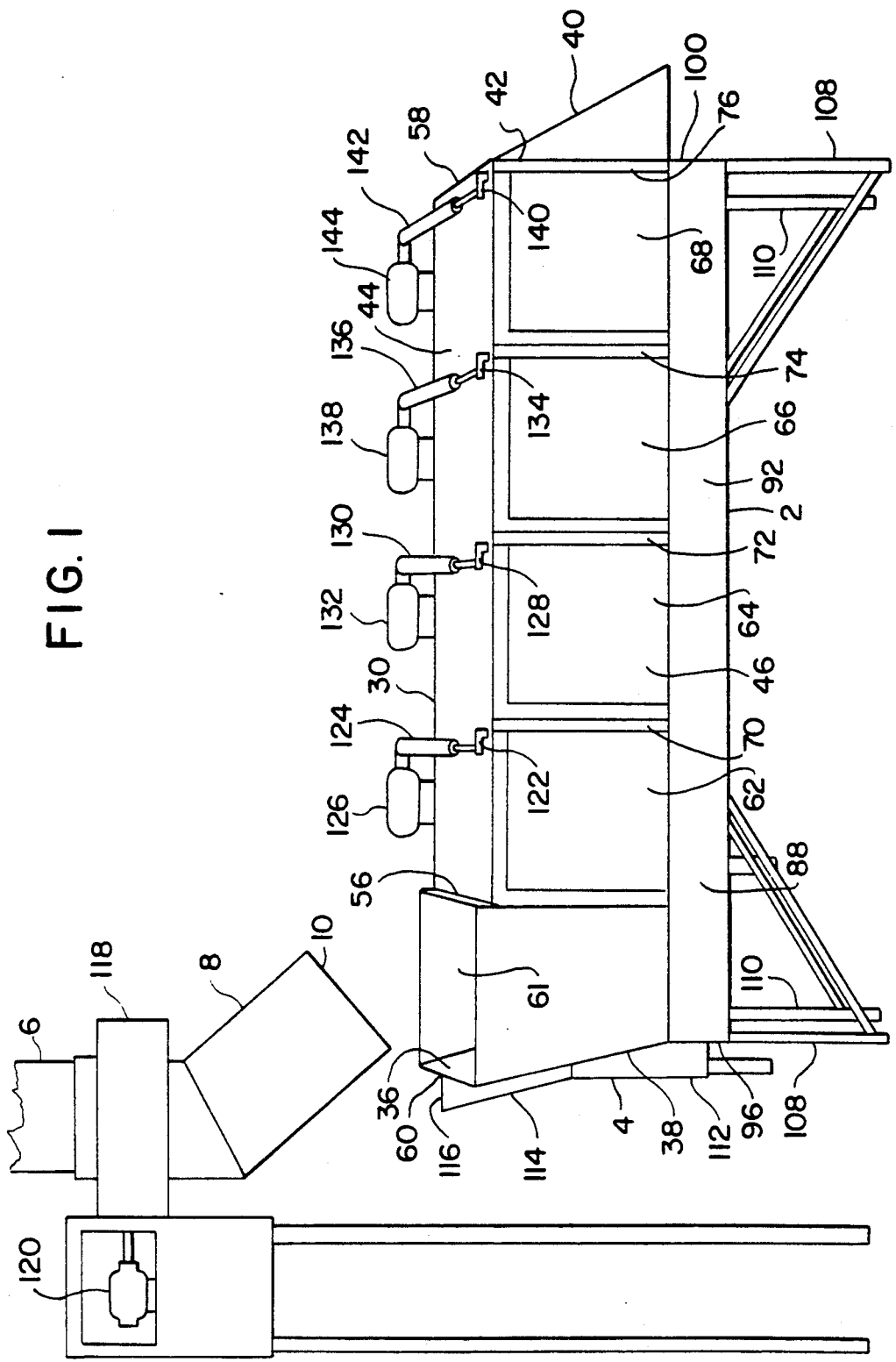
FIG. 1 is a perspective view of the conveyor assembly in accordance with this invention for distribution and discharge of recyclable materials, with a portion of the compactor for garbage shown behind the conveyor assembly, and with the rotatable chute in position above the hopper of the conveyor assembly.
Figure 2:
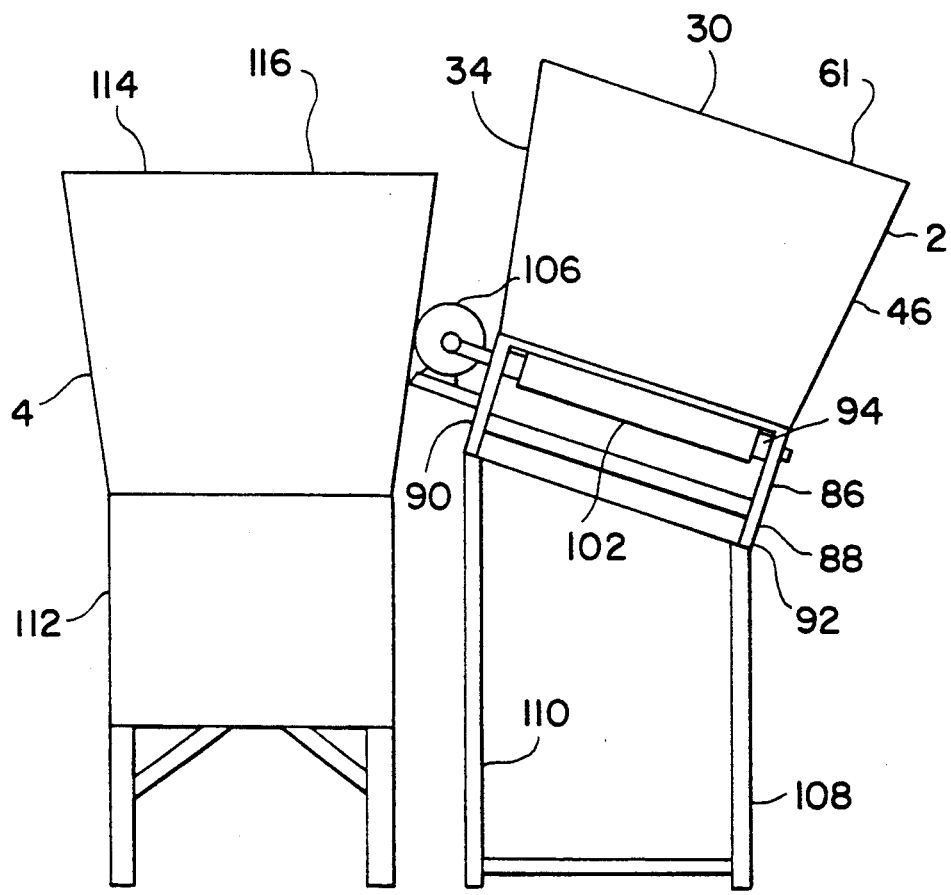
FIG. 2 is an end elevation view of the conveyor assembly to illustrate its laterally tilted position and of the compactor alongside the conveyor assembly.
Figure 3:
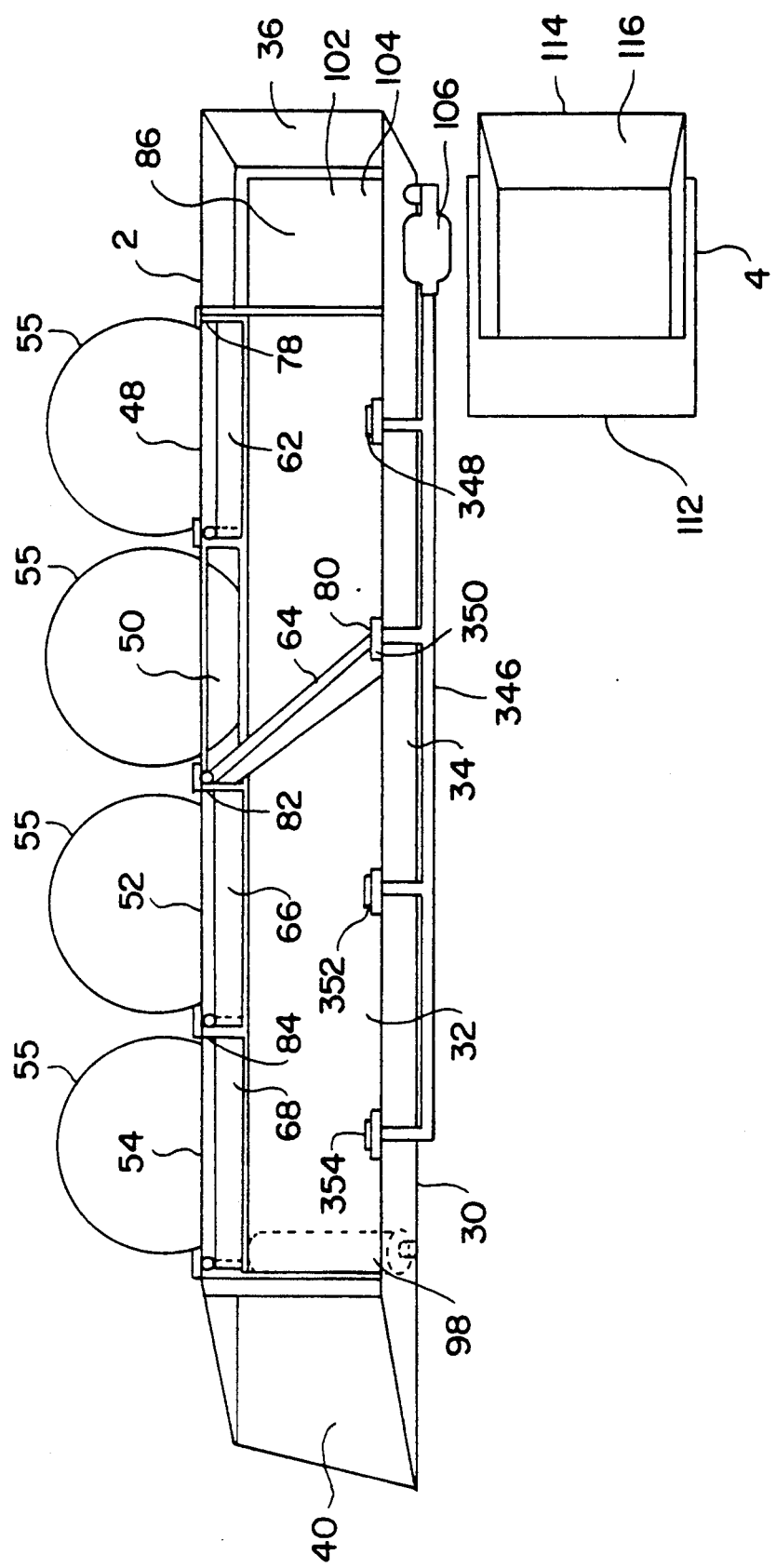
FIG. 3 is a perspective view from above of the conveyor assembly for recyclable materials in which the top wall has been removed to illustrate one of the discharge doors extending at a diagonal across the conveyor passageway when in its fully open position to divert the particular kind of recyclable items intended for that discharge outlet through the opening and into the receptacle below as the conveyor belt carries the material in the downstream direction, the compactor for garbage also shown in position adjacent the conveyor assembly.
Figure 4:
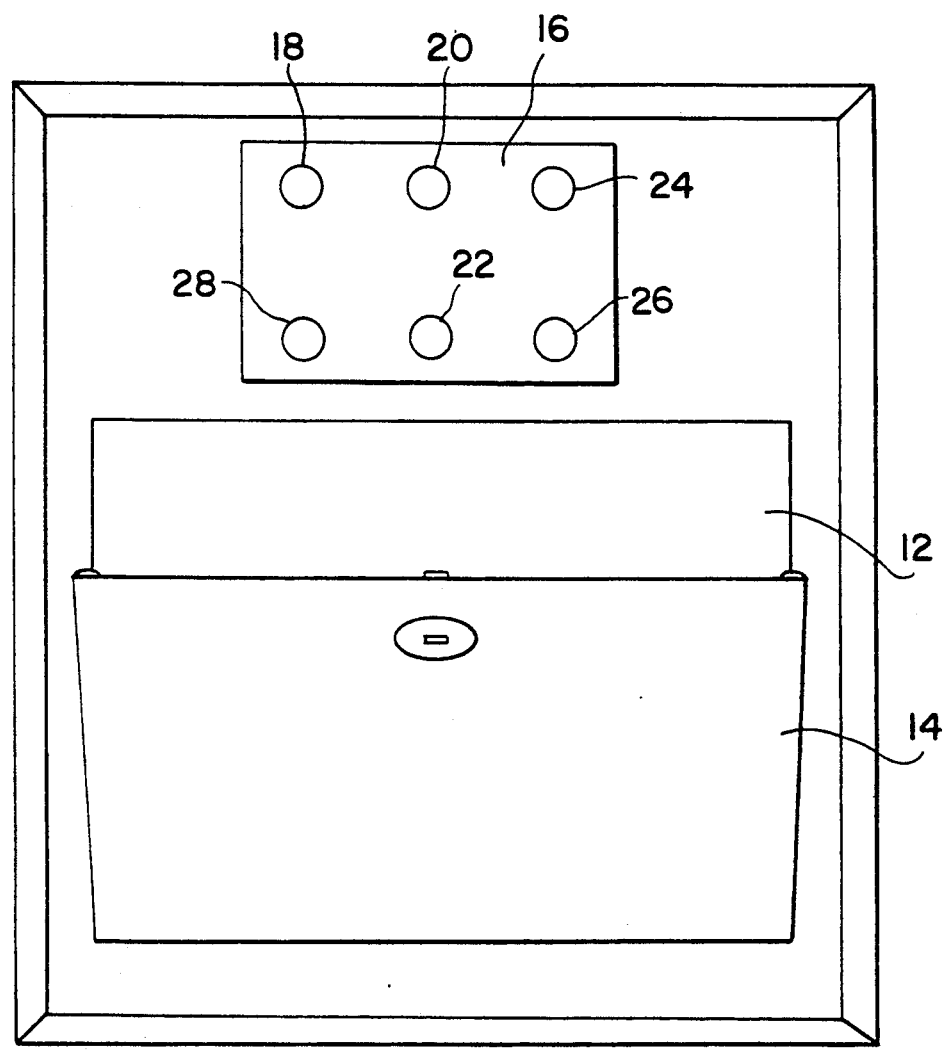
FIG. 4 is an elevation view of a disposal door and a control panel, one of which is located on each floor of a multi-story building, the disposal door opening to the chute leading to the conveyor assembly and compactor on the lowest floor of the building or in the basement.
Figure 5:
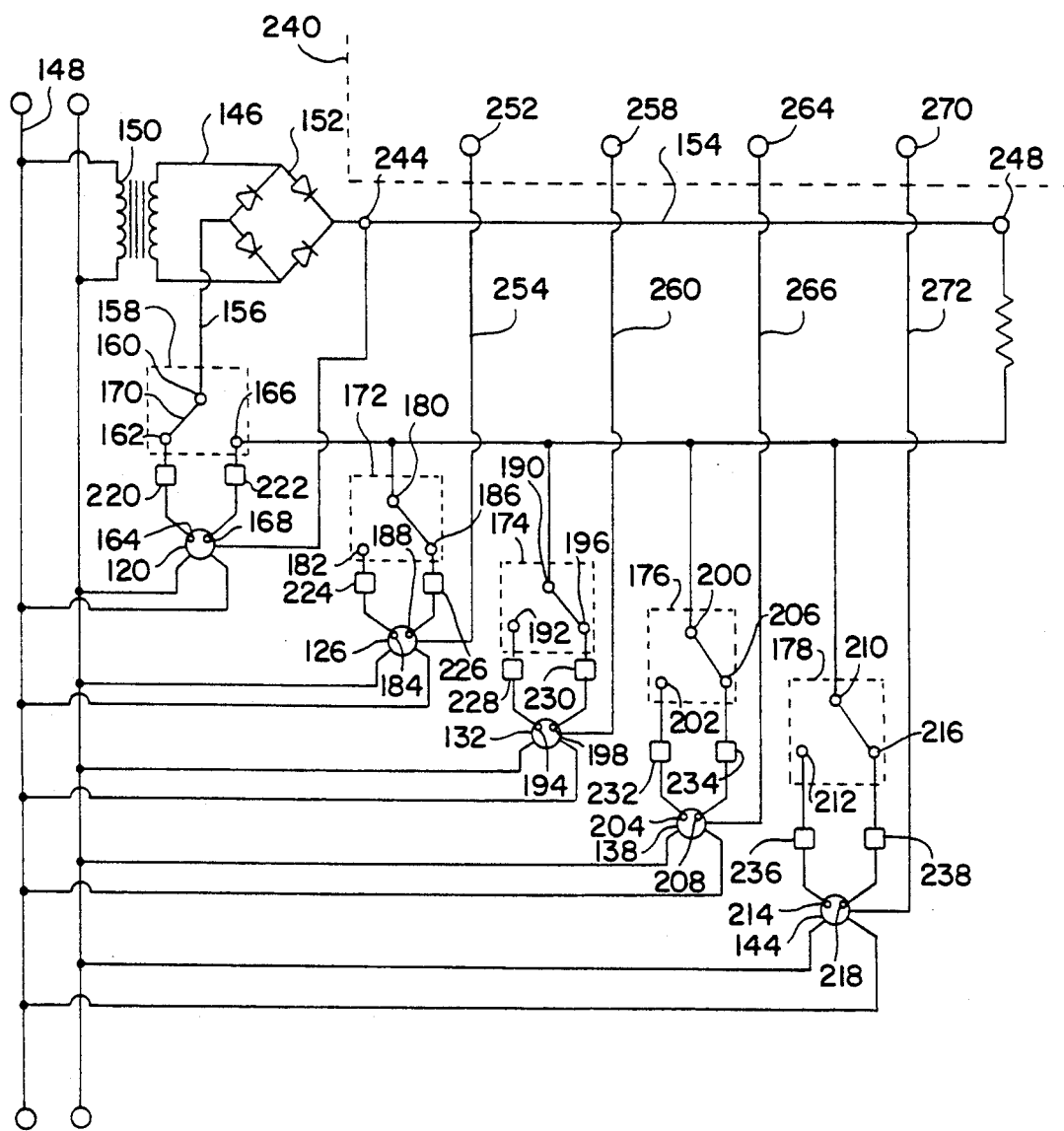
FIG. 5 is a schematic of the control circuit which controls rotation of the chute between the compactor and conveyor assembly, and also controls opening and closing of the discharge doors of the conveyor assembly.
Figure 6:
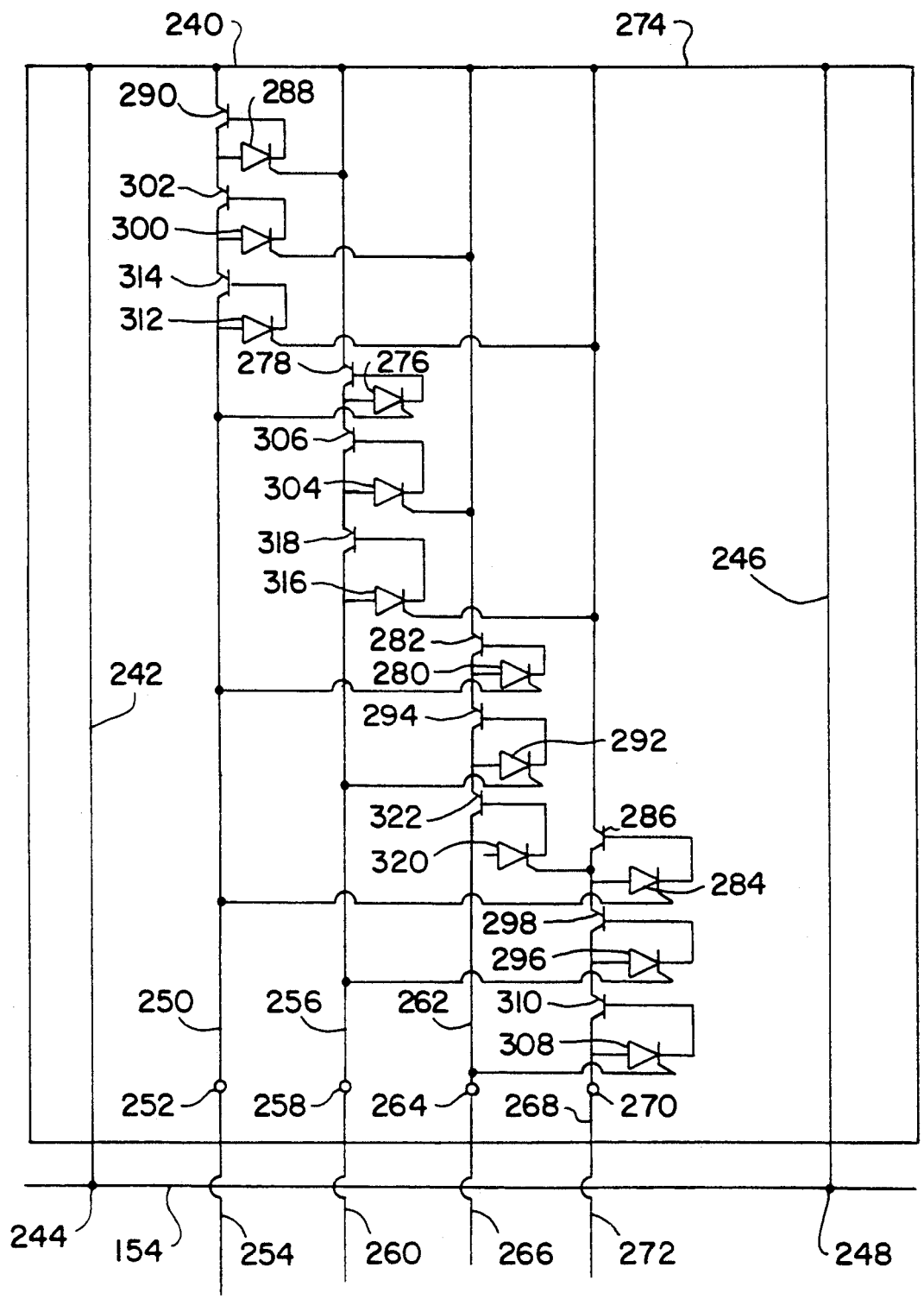
FIG. 6 is a schematic of the selective disabling circuit to which the control circuit is connected whereby when one discharge door has been opened, none of the others can be opened in response to a person on a different floor who may inadvertently press the push-button switch for disposal of a different kind of recyclable material.
Figure 7:
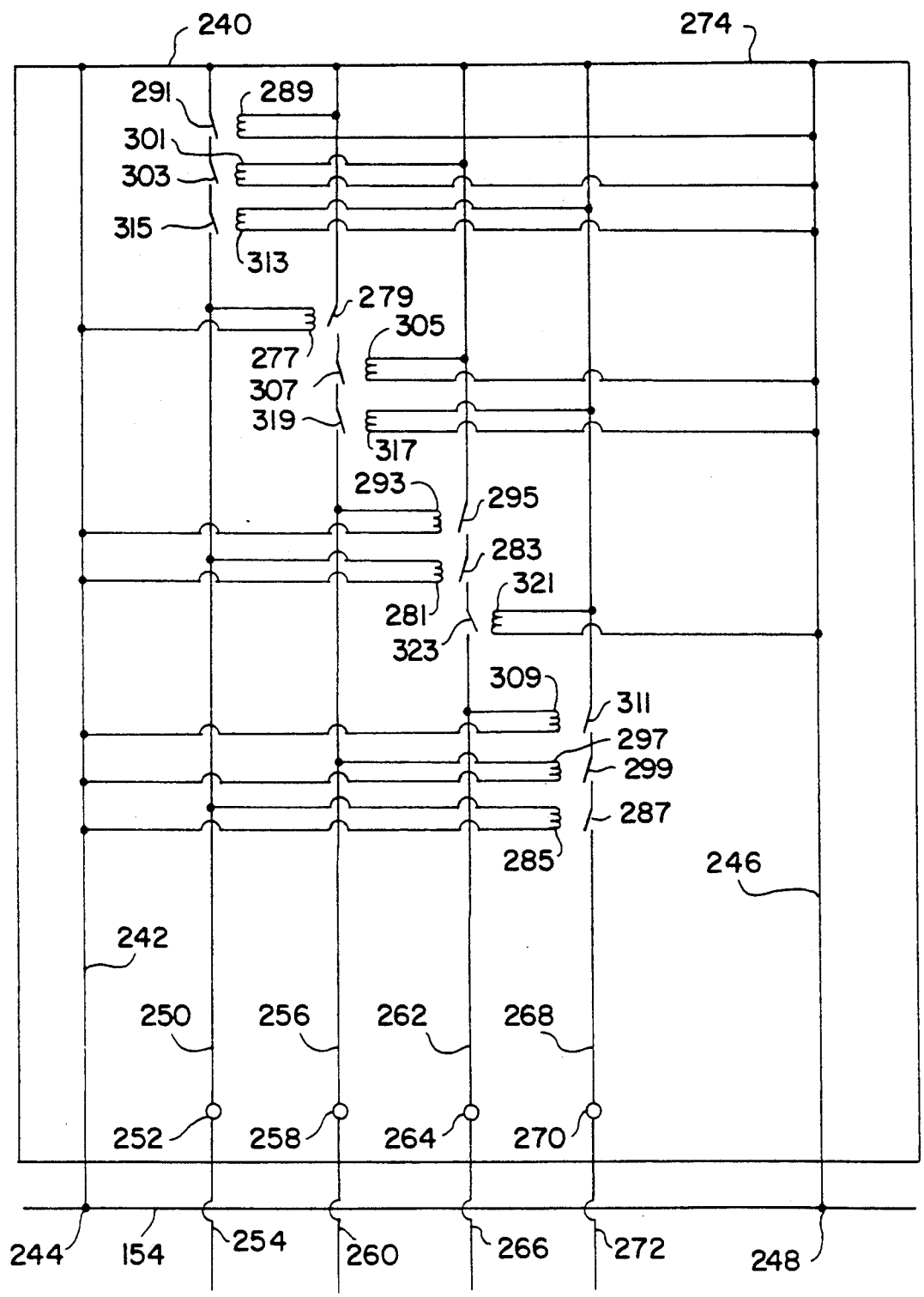
FIG. 7 is a schematic of a modified selective disabling circuit in accordance with this invention.
Figure 8:
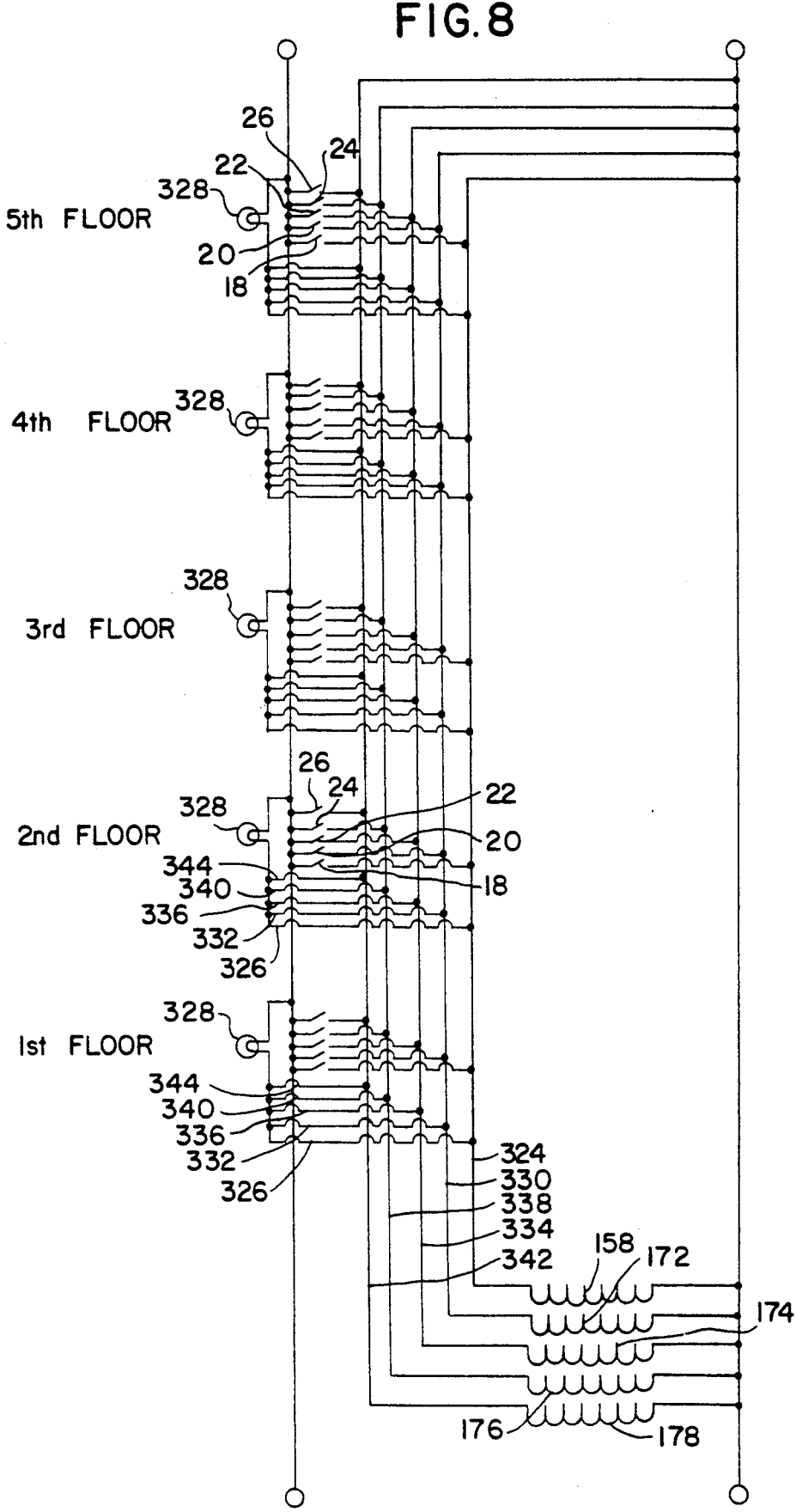
FIG. 8 is a schematic of the switches and in-use light in the control panel on each floor of a multi-story building, and their connection to the respective coils of the relays which control operation of the chute and the discharge doors.
Figure 9:
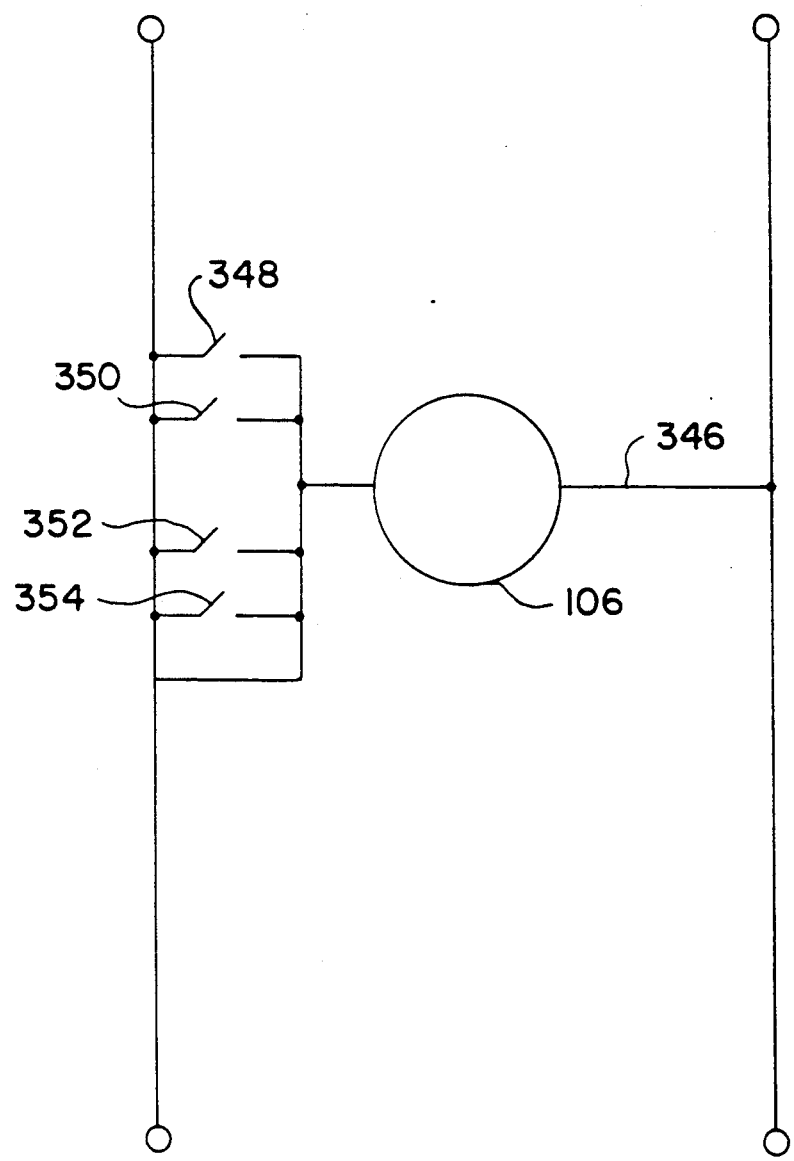
FIG. 9 is a schematic of the conveyor motor circuit.

A high rise recycling system in accordance with this invention includes a conveyor assembly 2, a compactor 4, a vertical chute 6 extending from the upper floor of a high rise building to the conveyor assembly 2 and compactor 4 located on the lowest floor or in the basement, and a rotatable spout 8 rotatably connected to the lower end 10 of the chute 6. When rotated to a first operating position, the spout 8 is in registration with the conveyor assembly 2, and when rotated to a second operating position the spout 8 is in registration with the compactor 4.

On each floor of the building, a disposal aperture 12 opens to the chute 6 having a hinged door 14 movable between an open and closed position, to receive disposable items therethrough when the door 14 is opened and to cover the disposal aperture 12 when the door 14 is in its closed position.

A control panel 16 is provided above the door 14 on each floor, having five push-buttons, including a garbage to compactor push-button 18, a glass to conveyor push-button 20, a paper to conveyor push-button 22, an aluminum to conveyor push-button 24 and a plastic to conveyor push-button 26. The control panel 16 on each floor also includes an in-use light 28 which is energized and lights up at the control panel on each floor to show when someone is using the recycling system on one of the other floors.

The parts of each of these basic components of the recycling system are described in detail as follows.

The conveyor assembly 2 includes an elongated horizontally extending housing 30 having an elongated horizontally extending cavity 32. The housing 30 comprises a rearwardly facing elongated side wall 34, a closed first end wall 36 at one end 38 of the housing 30, an open second end wall 40 at the opposite end 42 of the housing 30, a top wall 44 and a forwardly facing elongated side wall 46, parallel to the rearwardly facing side wall 34 and spaced apart therefrom to define the elongated housing cavity 32 therebetween.

Four discharge openings are provided in the forwardly facing side wall 46, including a glass discharge opening 48 spaced apart from but nearest to the first end wall 36, a paper discharge opening 50 next in line, an aluminum discharge opening 52 next in line, and a plastic discharge opening 54 last in line and nearest to the second end wall 40. Receptacles 55 are placed below each discharge opening to receive the discharged recyclable items therein.

The top wall 44 of the housing 30 which spans the area encompassed by the discharge openings 48, 50, 52 and 54 is closed from its first end 5 nearest the housing first end wall 36 to its opposite second end 58 nearest the housing second end wall 40. The housing first end wall 36 tapers and converges inwardly at a diagonal in the direction towards the housing second end wall 40 as it extends downwardly from the top wall 44. The portion of the top wall 44 between the upper edge 60 of the diagonal first end wall 36 of the housing 30 and the first end 56 of the closed portion of top wall 44 is open to provide a hopper section 61, positioned for registration with the rotatable spout 8 when it is in its said first operating position.

The four discharge openings 48, 50, 52 and 54 each have respective hinged doors 62, 64, 66 and 68 which are hinged along the respective upwardly extending frame members 70, 72, 74 and 76 positioned along the downstream upwardly extending edge of each discharge opening 48, 50, 52 and 54 respectively. The hinged doors 62, 64, 66 and 68 are hinged to open inwardly of the housing cavity 32 and have a lateral dimension greater than the distance the rearwardly facing side wall 34 is spaced apart from the forwardly facing side wall 46. Thus, when the door 62 for the glass discharge opening 48 is moved to its fullest opening position inwardly of the housing cavity 32, its outer edge 78 comes into contact against the inner surface of the rearwardly facing side wall 34 at an obtuse angle therewith thereby providing a discharge flow path which is in line with the housing cavity 32 and then extends at a diagonal along the obtuse angled door 62 and outwardly through the glass discharge opening 48.

In the same manner, when the door 64 is moved to its fullest opening position inwardly of the housing cavity 32, its outer edge 80 comes into contact against the inner surface of the rearwardly facing side wall 34 at an obtuse angle therewith thereby providing a discharge flow path, when upstream door 62 is closed, which is in line with the housing cavity 32 and then extends at a diagonal along the obtuse angled door 64 and outwardly through the paper discharge opening 50.

When the next door 66 downstream from doors 62 and 64 is moved to its fullest opening position inwardly of the housing cavity 32, its outer edge 82 comes into contact against the inner surface of the rearwardly facing side wall 34 at an obtuse angle therewith thereby providing a discharge flow path, when upstream doors 62 and 64 are closed, which is in line with the housing cavity 32 and then extends at a diagonal along the obtuse angled door 66 and outwardly through the aluminum discharge opening 52.

When the last door 68 downstream from doors 62, 64 and 66 is moved to its fullest opening position inwardly of the housing cavity 32, its outer edge 84 comes into contact against the inner surface of the rearwardly facing side wall 34 at an obtuse angle therewith thereby providing a discharge flow path, when upstream doors 62, 64 and 66 are closed, which is in line with the housing cavity 32 and then extends at a diagonal along the obtuse angled door 68 and outwardly through the plastic discharge opening 54.

The conveyor assembly 2 includes a conveyor drive belt assembly 86 comprising a rectangular frame 88 having a first elongated frame side wall 90 and a spaced apart second elongated frame side wall 92, a drive roller 94 rotatably mounted between frame side walls 90 and 92 near one end 96 of the frame 88, a free wheeling roller 98 near the opposite end 100 of the frame 88, and a continuous conveyor belt 102 positioned on the drive roller 94 and free wheeling roller 98 for movement of the upper surface 104 thereof in the direction from the one end 96 of frame 88 toward its opposite end 100 when the conveyor motor 106 rotates the drive roller 94 to thereby operate the conveyor drive belt assembly 86.

The housing 30 is secured in place above the conveyor drive belt assembly 86 with the hopper section 61 of the housing 30 positioned above the conveyor belt region adjacent the one end 96 of frame 88 and with the open second end wall 40 of the housing 30 adjacent to and overhanging the opposite end 100 of the frame 88 of the conveyor drive belt assembly 86. The second end wall 40 of the housing 30 is open to allow any material on the conveyor belt 102 which has not been discharged through one of the four discharge openings 48, 50, 52 and 54 to be discharged through the open end wall 40.

The conveyor drive belt assembly 86 and housing 30 secured thereto are positioned at a lateral incline wherein the first side wall 90 of the conveyor frame 88 and rearwardly facing side wall 34 of the housing 30 are higher than the second side wall 92 of the conveyor frame 88 and forwardly facing side wall 46 of the housing 30 The conveyor drive assembly 86 and housing 30 are supported in such inclined position by two relatively shorter support legs 108 secured to the bottom edge of side wall 92 of conveyor frame 88 and two relatively longer support legs 110 secured to the bottom edge of side wall 90 of conveyor frame 88. Thus, when items are carried on the conveyor belt 102 and come in contact with a selected one of the diagonally extending open doors 62, 64, 66 or 68, such items are able to slide downwardly as they slide diagonally along the surface of the door toward the corresponding discharge opening 48, 50, 52 or 54 and out therethrough into a receptacle placed below and in line with each discharge opening.

The compactor 4 comprises a compactor operating section 112 to compact garbage fed into such compactor operating section, and a compactor hopper section 114 positioned above the operating section having an open top wall 116. The compactor 4 is positioned adjacent the conveyor assembly 2, with the open top wall 116 of the compactor hopper section 114 in registration with the rotatable spout 8 at the lower end of chute 6 when it has been rotated to its said second operating position.

The rotatable spout 8 is rotated between its said first and second operating positions by drive assembly 118 powered by electric motor 120.

The hinged door 62 for the glass discharge opening 48 of the housing 30 is operated between its open and closed positions by crank 122 driven by worm gear assembly 124 powered by electric motor 126.

The hinged door 64 for the paper discharge opening 50 of the housing 30 is operated between its open and closed positions by crank 128 driven by worm gear assembly 130 powered by electric motor 132.

The hinged door 66 for the aluminum discharge opening 52 of the housing 30 is operated between its open and closed positions by crank 134 driven by worm gear assembly 136 powered by electric motor 138.

The hinged door 68 for the plastic discharge opening 54 of the housing 30 is operated between its open and closed positions by crank 140 driven by worm gear assembly 142 powered by electric motor 144.

The electric motor 120 which provides the power to rotate the spout 8 between its first operating position in registration with the conveyor assembly 2 and its second operating position in registration with the compactor 4, and the electric motors 126, 132, 138 and 144 which powers the door opening and closing mechanisms for discharge of recyclable glass, paper, aluminum and plastic materials are connected in control circuit 146 and to the power circuit 148.

Control circuit 146 comprises a step down transformer 150 connected on one side to the power circuit 148 and on its other side to a full wave bridge 152 which supplies control circuit voltage to control circuit conductors 154 and 156.

An override relay 158 is connected in the control circuit 146 to operate motor 120 which rotates spout 8 in such a way that when the spout is in registration with the compactor 4 for delivery of garbage thereto, none of the other motors 126, 132, 138 and 144 can be operated to open the doors to discharge openings 48, 50, 52 and 54 for recyclable materials. Thus, someone on a different floor cannot press one of the push-buttons for discharge of recyclable glass, paper, aluminum or plastic and inadvertently cause the spout to rotate to the conveyor assembly hopper 61 and one of the doors to one of the recyclable discharge openings to open thereby discharging garbage into a receptacle intended for recyclable materials.

Also, if someone on one floor is using the disposal system to dispose of recyclable glass, paper, aluminum or plastic, and if someone on a different floor should press the push-button switch for disposal of garbage to throw garbage down the chute, the override relay 158 will become energized to rotate the spout 8 to discharge into the compactor 4. Thus, the garbage will be directed into the compactor 4 and will not get into the receptacles intended for the recyclable materials.

Override rely 158 includes terminal 160 connected to control circuit conductor 156 leading to bridge 152, terminal 162 connected to motor terminal 164 to rotate motor 120 in the direction which rotates spout 8 to its second operating position for delivery of garbage into the compactor 4, and terminal 166 connected to motor terminal 168 to rotate motor 120 in the opposite direction which rotates spout 8 to its first operating position for delivery of recyclable materials into the hopper 61 of the recyclable conveyor assembly 2. Relay contact 170 is normally biased to connect relay terminal 160 to relay terminal 166, thereby completing the control circuit 146 through motor terminal 168 as well as through control circuit conductor 154 in which the door opening motors 126, 132, 138 and 144 are also connected through respective door opening relays 172, 174, 176 and 178.

Door operating relay 172 includes terminal 180 connected to control circuit conductor 154, terminal 182 connected to motor terminal 184 to rotate motor 126 in the door opening direction, and terminal 186 connected to motor terminal 188 to rotate motor 126 in the door closing direction. Relay 172 has its contact normally biased to connect relay terminal 180 to relay terminal 186, thereby completing the control circuit through motor terminal 18 for driving motor 126 in the door closing direction. When relay 172 is energized, its contact connects relay terminal 180 to relay terminal 182 thereby completing the control circuit through motor terminal 184 to rotate motor 126 in the door opening direction.

Door operating relay 174 includes terminal 190 connected to control circuit conductor 154, terminal 192 connected to motor terminal 194 to rotate motor 132 in the door opening direction, and terminal 196 connected to motor terminal 198 to rotate motor 132 in the door closing direction. Relay 17 has its contact normally biased to connect relay terminal 190 to relay terminal 196, thereby completing the control circuit through motor terminal 198 for driving motor 132 in the door closing direction. When relay 174 is energized, its contact connects relay terminal 190 to relay terminal 192, thereby completing the control circuit through motor terminal 194 to rotate motor 132 in the door opening direction.

Door operating relay 176 includes terminal 200 connected to control circuit conductor 154, terminal 202 connected to motor terminal 204 to rotate motor 138 in the door opening direction, and terminal 206 connected to motor terminal 208 to rotate motor 138 in the door closing direction. Relay 176 has its contact normally biased to connect relay terminal 200 to relay terminal 206, thereby completing the control circuit through motor terminal 208 for driving motor 138 in the door closing direction. When relay 176 is energized, its contact connects relay terminal 200 to relay terminal 202, thereby completing control circuit through motor terminal 204 to rotate motor 138 in the door opening direction.

Door operating relay 178 includes terminal 210 connected to control circuit conductor 154, terminal 212 connected to motor terminal 214 to rotate motor 144 in the door opening direction, and terminal 216 connected to motor terminal 218 to rotate motor 144 in the door closing direction. Relay 178 has its contact normally biased to connect relay terminal 210 to relay terminal 216, thereby completing the control circuit through motor terminal 218 for driving motor 144 in the door closing direction. When relay 178 is energized, its contact connects relay terminal 210 to relay terminal 212, thereby completing control circuit through motor terminal 214 to rotate motor 144 in the door opening direction.

Limit switch 220 is connected between terminal 162 of override relay 158 and terminal 164 of motor 120 to interrupt this circuit and discontinue operation of motor 120 when it has rotated spout 8 into registration with the compactor 4 for delivery of garbage thereto. At such time, the operating mechanism of limit switch 220 is contacted by the spout rotating mechanism to interrupt the circuit. It resets when the override relay 158 is de-energized to enable its contact to be normally biased back into contact with relay terminal 166 which completes the circuit with motor terminal 168 to rotate the spout 8 to its first operating position in registration with hopper 61 of the recyclable conveyor assembly 2.

Limit switch 222 is connected between terminal 166 of override relay 158 and terminal 168 of motor 120 to interrupt this circuit and discontinue operation of motor 120 when it has rotated spout into registration with hopper 61 of the recyclable conveyor assembly 2. At such time, the operating mechanism of limit switch 222 is contacted by the spout rotating mechanism to interrupt the circuit. It resets when the override relay 158 is energized to switch its contact from relay terminal 166 to relay terminal 162 which completes the circuit with motor terminal 164 to rotate the spout 8 to its second operating position in registration with the hopper of the compactor 4.

Limit switch 224 is connected between terminal 182 of door operating relay 172 and terminal 184 of motor 126 to interrupt this circuit and discontinue operation of motor 126 when it has fully opened the door 62 for the glass discharge opening 48 for discharge of recyclable glass material therethrough. At such time, the operating mechanism of limit switch 224 is contacted by the door operating mechanism to interrupt the circuit. It resets when the door operating relay 172 is de-energized to enable its contact to be normally biased back into contact with relay terminal 186 which completes the circuit with motor terminal 188 to rotate the motor 126 in its door closing direction to close the glass discharge opening 48.

Limit switch 226 is connected between terminal 186 of door operating relay 172 and terminal 188 of motor 126 to interrupt this circuit and discontinue operation of motor 126 when it has fully closed the door 62 for the glass discharge opening 48. At such time, the operating mechanism of limit switch 226 is contacted by the door operating mechanism to interrupt the circuit. It resets when the door operating relay 172 is energized to switch its contact from relay terminal 186 to relay terminal 182 which completes the circuit with motor terminal 184 to rotate the motor 126 in its door opening direction to open the glass discharge opening 48.

Limit switch 228 is connected between terminal 192 of door operating relay 174 and terminal 194 of motor 132 to interrupt this circuit and discontinue operation of motor 132 when it has fully opened the door 64 for the paper discharge opening 50 for discharge of recyclable paper materials therethrough. At such time, the operating mechanism of limit switch 228 is contacted by the door operating mechanism to interrupt the circuit. It resets when the door operating relay 174 is de-energized to enable its contact to be normally biased back into contact with relay terminal 196 which completes the circuit with motor terminal 198 to rotate motor 132 in its door closing direction to close the paper discharge opening 50.

Limit switch 230 is connected between terminal 196 of door operating relay 174 and terminal 198 of motor 132 to interrupt this circuit and discontinue operation of motor 132 when it has fully closed the door 64 for the paper discharge opening 50. At such time, the operating mechanism of limit switch 230 is contacted by the door operating mechanism to interrupt the circuit. It resets when the door operating relay 17 is energized to switch its contact from relay terminal 196 to relay terminal 192 which completes the circuit with motor terminal 194 to rotate the motor 132 in its door opening direction to open the paper discharge opening 50.

Limit switch 232 is connected between terminal 202 of door operating relay 176 and terminal 204 of motor 138 to interrupt this circuit and discontinue operation of motor 138 when it has fully opened the door 66 for the aluminum discharge opening 52 for discharge of recyclable aluminum materials therethrough. At such time, the operating mechanism of limit switch 232 is contacted by the door operating mechanism to interrupt the circuit. It resets when the door operating relay 176 is de-energized to enable its contact to be normally biased back into contact with relay terminal 206 which completes the circuit with motor terminal 208 to rotate motor 138 in its door closing direction to close the aluminum discharge opening 52.

Limit switch 234 is connected between terminal 206 of door operating relay 176 and terminal 208 of motor 138 to interrupt this circuit and discontinue operation of motor 138 when it has fully closed the door 66 for the aluminum discharge opening 52. At such time, the operating mechanism of limit switch 234 is contacted by the door operating mechanism to interrupt the circuit. It resets when the door operating relay 176 is energized to switch its contact from relay terminal 206 to relay terminal 202 which completes the circuit with motor terminal 204 to rotate motor 138 in its door opening direction to open the aluminum discharge opening 52.

Limit switch 236 is connected between terminal 212 of door operating relay 178 and terminal 214 of motor 144 to interrupt this circuit and discontinue operation of motor 144 when it has fully opened the door 68 for the plastic discharge opening 5 for the discharge of recyclable plastic materials therethrough. At such time, the operating mechanism of limit switch 236 is contacted by the door operating mechanism to interrupt the circuit. It resets when the door operating relay 178 is de-energized to enable its contact to be normally biased back into contact with relay terminal 216 which completes the circuit with motor terminal 218 to rotate motor 144 in its door closing direction to close the plastic discharge opening 54.

Limit switch 238 is connected between terminal 216 of door operating relay 178 and terminal 218 of motor 144 to interrupt this circuit and discontinue operation of motor 144 when it has fully closed the door 68 for the plastic discharge opening 54. At such time, the operating mechanism of limit switch 238 is contacted by the door operating mechanism to interrupt the circuit. It resets when the door operating relay 178 is energized to switch its contact from relay terminal 216 to relay terminal 212 which completes the circuit with motor terminal 214 to rotate motor 144 in its door opening direction to open the plastic discharge opening 54.

The control circuit 146 includes a selective disabling circuit 240 to prevent inadvertent opening of more than one of the four discharge openings 48, 50, 52 and 54 at any one time. Thus, if someone on one floor of a high rise building is using this invention to dispose of recyclable plastic materials in which case the last downstream door for plastic discharge opening 54 has been opened, someone on a different floor could not inadvertently cause an upstream door for discharge openings 48, 50 or 52 to open by pressing the push-button switch on such floor for discharge of recyclable glass, paper or aluminum. If such upstream doors could be opened while a user on a different floor was disposing of plastic materials, such plastic materials would be diverted unintentionally out through one of the upstream discharge openings 48, 50 or 52 intended only for glass, paper and aluminum respectively.

The selective disabling circuit 240 includes conductor 242 connected to control circuit conductor 154 at terminal 244, conductor 246 connected to control circuit conductor 154 at terminal 248, conductor 250 connected at terminal 252 to conductor 254 leading to motor 126 which opens and closes the glass discharge opening 48, conductor 256 connected at terminal 258 to conductor 260 leading to motor 132 which opens and closes the paper discharge opening 50, conductor 262 connected at terminal 264 to conductor 266 leading to motor 138 which opens and closes the aluminum discharge opening 52, and conductor 268 connected at terminal 270 to conductor 272 leading to motor 144 which opens and closes the plastic discharge opening 54.

Conductors 250, 256, 262 and 268 are connected across conductors 242 and 246 of the selective disabling circuit 240 by connection to conductor 274. The selective disabling circuit 24 is energized by its connection to control circuit conductor 15 through selective disabling circuit conductors 242 and 246.

When the recyclable glass door opening relay 172 is energized by someone on one floor of a high rise pushing the button switch for disposal of glass material, its contact is switched from relay terminal 186 to relay terminal 182 thereby energizing motor 126 to rotate in the door opening direction and energizing conductor 254 plus conductor 250 of the selective disabling circuit 240. When conductor 250 is energized it creates an open circuit condition in conductors 256 and 260 leading to the paper discharge motor 132, in conductors 262 and 266 leading to the aluminum discharge motor 138, and in conductors 268 and 272 leading to the plastic discharge motor 144. The open circuit condition in these conductors leading to the operating components of the other discharge doors and openings is accomplished by current in conductor 250, for example, energizing the gates of SCRs (silicon controlled rectifiers) connected in conductors 250, 256, 262 and 268 to apply a signal voltage to associated transistors also connected therein to switch them to a non-conductive state, thereby creating open circuit conditions in conductor 250, 256, 262 and 268 of the selective disabling circuit and in conductors 254, 260, 266 and 272 leading respectively to motors 132, 138 and 144. In this example, when the circuit controlling motor which opens the glass discharge door is energized, the other circuits which control the motors which open the paper discharge door, the aluminum discharge door and the plastic discharge door are disabled and rendered non-conductive. The same is true when any one of the door controlling circuits is energized, the other three are disabled and rendered non-conductive.

When conductor 25 (glass discharge circuit) is energized for disposal of glass materials, an open circuit condition is created in conductor 256 (paper discharge circuit) by energizing the gate of SCR 276 thereby rendering it conductive and in turn applying a voltage to the base of transistor 278 to switch it to a non-conductive state in conductor 256; in conductor 262 (aluminum discharge circuit) by energizing the gate of SCR 280 thereby rendering it conductive and in turn applying a voltage to the base of transistor 282 to switch it to a non-conductive state in conductor 262; and in conductor 268 (plastic discharge circuit) by energizing the gate of SCR 284 thereby rendering it conductive and in turn applying a voltage to the base of transistor 286 to switch it to a non-conductive state in conductor 268.

When conductor 256 (paper discharge circuit) is energized for disposal of paper materials, an open circuit condition is created in conductor 250 (glass discharge circuit) by energizing the gate of SCR 288 thereby rendering it conductive and in turn applying a voltage to the base of transistor 290 to switch it to a non-conductive state in conductor 250; in conductor 262 (aluminum discharge circuit) by energizing the gate of SCR 292 thereby rendering it conductive and in turn applying a voltage to the base of transistor 294 to switch it to a non-conductive state in conductor 262; and in conductor 268 (plastic discharge circuit) by energizing the gate of SCR 296 thereby rendering it conductive and in turn applying a voltage to the base of transistor 298 to switch it to a non-conductive state in conductor 268.

When conductor 262 (aluminum discharge circuit) is energized for disposal of aluminum materials, an open circuit condition is created in conductor 250 (glass discharge circuit) by energizing the gate of SCR 300 thereby rendering it conductive and in turn applying a voltage to the base of transistor 302 to switch it to a non-conductive state in conductor 250; in conductor 256 (paper discharge circuit) by energizing the gate of SCR 304 thereby rendering it conductive and in turn applying a voltage to the base of transistor 306 to switch it to a non-conductive state in conductor 256; and in conductor 268 (plastic discharge circuit) by energizing the gate of SCR 308 thereby rendering it conductive and in turn applying a voltage to the base of transistor 310 to switch it to a non-conductive state in conductor 268

When conductor 268 (plastic discharge circuit) is energized for disposal of plastic materials, an open circuit condition is created in conductor 250 (glass discharge circuit) by energizing the gate of SCR 312 thereby rendering it conductive and in turn applying a voltage to the base of transistor 314 to switch it to a non-conductive state in conductor 250; in conductor 256 (paper discharge circuit) by energizing the gate of SCR 316 thereby rendering it conductive and in turn applying a voltage to the base of transistor 318 to switch it to a non-conductive state in conductor 256; and in conductor 262 (aluminum discharge circuit) by energizing the gate of SCR 320 thereby rendering it conductive and in turn applying a voltage to the base of transistor 322 to switch it to a non-conductive state in conductor 262.

Thus, if any one of the conductors 250, 256, 262 or 268 of the selective disabling circuit 24 is energized for disposal of one kind of recyclable material, and if someone on a different floor attempts to dispose of a different material by pressing the push-button switch which would normally energize one of the other conductors 250, 256, 262 or 268, any initial current flow in such other conductors would be shunted through the SCR in that other conductor to the base of the associated transistor to cause it to block current flow from its emitter to collector which are connected in each of the conductors 250, 256, 262 and 268. The transistors are connected in conductors 250, 256, 262 and 268 to permit current flow in such conductors when the gates of the associated SCRs are not energized and the associated SCRs are not applying a voltage to the base of their corresponding transistors to which they are respectively connected.

The selective disabling circuit 240 may in the alternative to the electronic switching components of SCRs and transistors utilize a plurality of relays to disable the other three door opening circuits when any one of them is energized and in use.

When conductor 250 (glass discharge circuit) is energized and in use, the coil of relay 277 is energized to attract its contact 279, normally biased to the contact closed position, to the contact open position to interrupt and disable conductor 256 (paper discharge circuit); the coil of relay 281 is energized to attract its contact 283, normally biased to the contact closed position, to the contact open position to interrupt and disable conductor 26 (aluminum discharge circuit); and the coil of relay 285 is energized to attract its contact 287, normally biased to the contact closed position, to the contact open position to interrupt and disable conductor 268 (plastic discharge circuit).

When conductor 256 (paper discharge circuit) is energized and in use, the coil of relay 289 is energized to attract its contact 291, normally biased to the contact closed position to the contact open position to interrupt and disable conductor 250 (glass discharge circuit); the coil of relay 293 is energized to attract its contact 295, normally biased to the contact closed position, to the contact open position to interrupt and disable conductor 262 (aluminum discharge circuit); and the coil of relay 297 is energized to attract its contact 299, normally biased to the contact closed position, to the contact open position to interrupt and disable conductor 26 (plastic discharge circuit).

When conductor 262 (aluminum discharge circuit) is energized and in use, the coil of relay 301 is energized to attract its contact 303, normally biased to the contact closed position, to the contact open position to interrupt and disable conductor 250 (glass discharge circuit); the coil of relay 305 is energized to attract its contact 307, normally biased to the contact closed position, to the contact open position to interrupt and disable conductor 256 (paper discharge circuit); and the coil of relay 309 is energized to attract its contact 311, normally biased to the contact closed position, to the contact open position to interrupt and disable conductor 268 (plastic discharge circuit).

When conductor 268 (plastic discharge circuit) is energized and in use, the coil of relay 313 is energized to attract its contact 315, normally biased to the contact closed position, to the contact open position to interrupt and disable conductor 250 (glass discharge circuit); the coil of relay 317 is energized to attract its contact 319, normally biased to the contact closed position, to the contact open position to interrupt and disable conductor 256 (paper discharge circuit); and the coil of relay 321 is energized to attract its contact 323, normally biased to the contact closed position, to the contact open position to interrupt and disable conductor 262 (aluminum discharge circuit).

Five push-button switches 18, 20, 22, 24 and 26 on each floor of a high rise building on the control panel 16 are located above the entrance door 14 to the disposal chute 16. Their operation on each floor and connection to the building power supply is the same so only those on one floor will be described in detail.

Push button switch 18 is connected across the building power supply through conductor 324 to the coil of relay 158. When push button switch 18 is pushed in, its contacts complete the circuit across the building power supply to energize the coil of relay 158 which as described above causes motor 120 to rotate the spout 8 to the compactor 4 to receive garbage that is. to be dropped into the chute 6. When conductor 324 becomes energized, current then flows through each of the signal lamp conductors 326 on all floors of the building, causing signal lamps 328 on each floor to glow thereby indicating that the recycling disposal system is in use.

When disposal of garbage from one floor has been completed, the push button switch 18 is pressed again which causes its contacts to separate and interrupt current flow to the relay 158 as well as to the signal lamps 328 on each floor. The contact of relay 158 is normally biased toward relay terminal 166 to which it returns when the coil of relay 158 is de-energized, thereby completing the circuit with motor terminal 168 to rotate motor 120 in the opposite direction which in turn rotates the spout 8 from registration with the hopper of the compactor 4 to the hopper of the recyclable conveyor assembly 2.

When it is desired to dispose of recyclable glass materials from one floor of the building, push button switch 20 is pressed causing its contacts to complete the circuit across the building power supply through conductor 330. The coil of relay 172 is thus energized causing its contact to switch to terminal 182 completing the circuit with terminal 184 of motor 126 causing it to rotate in the direction which opens the door to the glass discharge opening 48. At such time, current also flows through lamp conductors 332 on all floors of the building, causing signal lamps 328 on each floor to glow thereby indicating that the recycling disposal system is in use.

After the recyclable glass has been disposed of, push button switch 20 is pressed again which causes its contacts to separate and interrupt current flow to the coil of relay 172 as well as to the signal lamps 328 on each floor. The contact of relay 172 is normally biased toward relay terminal 186 to which it returns when the coil of relay 172 is de-energized, thereby completing the circuit with motor terminal 188 to rotate motor 126 in the direction which closes the door of the glass discharge opening 48.

When it is desired to dispose of recyclable paper materials from any one floor of the building, push button switch 22 is pressed causing its contacts to complete the circuit across the building power supply through conductor 334. The coil of relay 174 is thus energized causing its contact to switch to terminal 19 completing the circuit with terminal 194 of motor 132 causing it to rotate in the direction which opens the door to the paper discharge opening 50. At such time, current also flows through lamp conductors 336 on all floors of the building, causing signal lamps 328 on each floor to glow thereby indicating that the recycling disposal system is in use.

After the recyclable paper has been disposed of, push button switch 22 is pressed again which causes its contacts to separate and interrupt current flow to the coil of relay 174 as well as to the signal 328 on each floor. The contact of relay 174 is normally biased toward relay terminal 196 to which it returns when the coil of relay 174 is de-energized, thereby completing the circuit with motor terminal 198 to rotate motor 13 in the direction which closes the door of the glass discharge opening 50.

When it is desired to dispose of recyclable aluminum from anyone floor of the building, push button switch 24 is pressed causing its contacts to complete the circuit across the building power supply through conductor 338. The coil of relay 176 is thus energized causing its contact to switch to terminal 202 completing the circuit with terminal 204 of the motor 138 causing it to rotate in the direction which opens the door to the aluminum discharge opening 52. At such time, current also flows through lamp conductors 340 on all floors of the building, causing signal lamps 328 on each floor to glow thereby indicating that the recycling disposal system is in use.

After the recyclable aluminum has been disposed of, push button switch 24 is pressed again which causes its contacts to separate and interrupt current flow to the coil of relay 176 as well as to the signal lamps 328 on each floor. The contact of relay 176 is normally biased toward relay terminal 206 to which it returns when the coil of relay 176 is de-energized, thereby completing the circuit with motor terminal 208 to rotate motor 13 in the direction which closes the door of the aluminum discharge opening 52.

When it is desired to dispose of recyclable plastic materials from any one floor of the building, push button 26 is pressed causing its contacts to complete the circuit across the building power supply through conductor 342. The coil of relay 178 is thus energized causing its contact to switch to terminal 212 completing the circuit with terminal 214 of the motor 144 causing it to rotate in the direction which opens the door to the plastic discharge opening 54. At such time, current also flows through lamp conductors 344 on all floors of the building, causing signal lamps on each floor to glow thereby indicating that the recycling disposal system is in use.

After the recyclable plastic material has been disposed of, push button switch 26 is pressed again which causes its contacts to separate and interrupt current flow to the coil of relay 178 as well as to the signal lamps 328 on each floor. The contact of relay 17 is normally biased toward relay terminal 216 to which it returns when the coil of relay 178 is de-energized, thereby completing the circuit with motor terminal 218 to rotate motor 144 in the direction which closes the door of the aluminum discharge opening 54.

In accordance with this invention, the conveyor belt 102 cannot move until the desired one of the hinged doors 62, 64, 66 and 68 has been fully opened to direct the contents deposited on the conveyor belt 102 out through the intended discharge opening 48, 50, 52 or 54. The conveyor motor 106 is connected across the building power supply through conductor 346 and automatically operated switches 348 (whose switch operating lever is moved into the contact closed position by the hinged door 62 when it reaches its fully open position to start the conveyor and into the contact open position to stop the conveyor when the door 62 begins to move back toward its closed position), 350 (whose switch operating lever is moved into the contact closed position by the hinged door 64 when it reaches its fully open position to start the conveyor and into the contact open position to stop the conveyor when the door 64 begins to move back toward its closed position), 352 (whose switch operating lever is moved into the contact closed position by the hinged door 66 when it reaches its fully open position to start the conveyor and into the contact open position to stop the conveyor when the door 66 begins to move back toward its closed position), 354 (whose switch operating lever is moved into the contact closed position by the hinged door 68 when it reaches its fully open position to start the conveyor and into the contact open position to stop the conveyor when the door 68 begins to move back toward its closed position).

I claim:

1. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said first disposal receiving chamber comprises a hopper mounted on a compactor for discharge of garbage into said hopper to be compacted by said compactor.

2. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said upwardly extending chute is installed in a building having a plurality of stories, said entrance aperture means opening to said chute to receive disposable items therein for disposal including a plurality of entrance apertures in one above the other arrangement, a one of said plurality of entrance apertures opening to said chute at each one of said plurality of stories for discharge of disposable items into said chute for disposal from each of said stories of said building.

3. A disposal system as set forth in claim 2, wherein said entrance aperture means includes a corresponding plurality of doors mounted to open and close respective ones of said plurality of entrance apertures.

4. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said second disposal receiving chamber comprises a hopper integrally formed as part of said elongated housing at said upstream end thereof for discharge of recyclable materials into said hopper to be conveyed by said conveyor means from said upstream end of said elongated housing in the direction toward said downstream end thereof, wherein said elongated housing includes a first elongated side wall and a first elongated lower edge along one side of said elongated housing, a second elongated side wall and a second elongated lower end along the opposite side of said elongated housing, said conveyor means including a conveyor member facing upwardly to receive said recyclable materials thereon when fed into said hopper portion of said elongated housing and movable in the direction from said upstream end of said housing to said downstream end thereof, said upwardly facing conveyor member having a first edge which extends along said first side wall of said housing near said first lower edge thereof, a second side edge which extends along said second side wall of said housing near said second lower edge thereof, said conveyor member being mounted with its second side edge at a higher elevation than its first side edge to cause recyclable materials thereon to gravitate towards said first side edge of said conveyor member and said first side wall of said housing as it is conveyed from said upstream end of said housing toward said downstream end thereof, said selective discharge means includes a first discharge opening in said first side wall of said housing having an upwardly extending upstream side edge and an upwardly extending downstream side edge, a first discharge door pivotally mounted adjacent said upwardly extending downstream side edge of said first discharge opening, said first discharge door being pivotable from a closed position which closes said first discharge opening inwardly of said elongated conveyor cavity and above said upwardly facing conveyor member to open said first discharge opening, said first discharge door having a downstream side edge pivotally mounted adjacent said downstream side edge of said first discharge opening and an opposite upstream side edge, the dimension of said first discharge door between its said downstream and upstream side edges being greater than the dimension across said conveyor cavity between said first side wall of said elongated housing and said second side wall thereof, whereby said first discharge door in its most fully open position extends at a diagonal across said conveyor cavity with its upstream side edge farther upstream and its downstream side edge farther downstream to thereby provide a diagonal abutment wall to direct recyclable materials on said conveyor member out through said first discharge opening.

5. A disposal system as set forth in claim 4, wherein said selective discharge means includes a second discharge opening in said first side wall of said housing having an upwardly extending upstream side edge and an upwardly extending downstream side edge, said second discharge opening being downstream from said first discharge opening, a second discharge door pivotally mounted adjacent said upwardly extending downstream side edge of said second discharge opening, said second discharge door being pivotable from a closed position which closes said second discharge opening inwardly of said elongated conveyor cavity and above said upwardly facing conveyor member to open said second discharge opening, said second discharge door having a downstream side edge pivotally mounted adjacent said downstream side edge of said second discharge opening and an opposite upstream side edge, the dimension of said second discharge door between its said downstream and upstream side edges being greater than the dimension across said conveyor cavity between said first side wall of said elongate housing and said second side wall thereof, whereby said second discharge door in its most fully open position extends at a diagonal across said conveyor cavity with its upstream side edge farther upstream and its downstream side edge farther downstream to thereby provide a diagonal abutment wall to direct recyclable materials on said conveyor member out through said second discharge opening.

6. A disposal system as set forth in claim 5, wherein said selective discharge means includes a third discharge opening in said first side wall of said housing having an upwardly extending upstream side edge and an upwardly extending downstream side edge, said third discharge opening being downstream from said second discharge opening, a third discharge door pivotally mounted adjacent said upwardly extending downstream side edge of said third discharge opening, said third discharge door being pivotable from a closed position which closes said third discharge opening inwardly of said elongated conveyor cavity and above said upwardly facing conveyor member to open said third discharge opening, said third discharge door having a downstream side edge pivotally mounted adjacent said downstream side edge of said third discharge opening and an opposite upstream side edge, the dimension of said third discharge door between its said downstream and upstream side edges being greater than the dimension across said conveyor cavity between said first side wall of said elongated housing and said second side wall thereof, whereby said third discharge door in its most fully open position extends at a diagonal across said conveyor cavity with its upstream side edge farther upstream and its downstream side edge farther downstream to thereby provide a diagonal abutment wall to direct recyclable materials on said conveyor member out through said third discharge opening.

7. A disposal system as set forth in claim 6, wherein said selective discharge means includes a fourth discharge opening in said first side wall of said housing having an upwardly extending upstream side edge and an upwardly extending downstream side edge, said fourth discharge opening being downstream from said third discharge opening, a fourth discharge door pivotally mounted adjacent said upwardly extending downstream side edge of said fourth discharge opening, said fourth discharge door being pivotable from a closed position which closes said fourth discharge opening inwardly of said elongated conveyor cavity and above said upwardly facing conveyor member to open said fourth discharge opening, said fourth discharge door having a downstream side edge pivotally mounted adjacent said downstream side edge of said fourth discharge opening and an opposite upstream side edge, the dimension of said fourth discharge door between its said downstream and upstream side edges being greater than the dimension across said conveyor cavity between said first side wall of said elongated housing and said second side wall thereof, whereby said fourth discharge door in its most fully open position extends at a diagonal across said conveyor cavity with its upstream side edge farther upstream and its downstream side edge farther downstream to thereby provide a diagonal abutment wall to direct recyclable materials on said conveyor member out through said fourth discharge opening.

8. A disposal system as set forth in claim 7, wherein said selective discharge means includes a first door operating mechanism to open and close said first discharge door and a first door operating motor to power said first door operating mechanism, a second door operating mechanism to open and close said second discharge door and a second door operating motor to power said first door operating mechanism, a third door operating mechanism to open and close said third discharge door and a third door operating motor to power said third door operating mechanism, a fourth door operating mechanism to open and close said fourth discharge door and a fourth door operating motor to power said fourth door operating mechanism, a selective discharge means control circuit, said first, second, third and fourth door operating motors being connected in said selective discharge means control circuit, said selective discharge means control circuit including first switch means operable between a first switch position to energize said first door operating motor to rotate in the door opening direction and a second switch position to energize said first door operating motor to rotate in the door closing direction, second switch means operable between a first switch position to energize said second door operating motor to rotate in the door opening direction and a second switch position to energize said second door operating motor to rotate in the door closing direction, third switch means operable between a first switch position to energize said third door operating motor to rotate in the door opening direction and a second switch position to energize said third door operating motor to rotate in the door closing direction, and fourth switch means operable between a first switch position to energize said fourth door operating motor to rotate in the door opening direction and a second switch position to energize said fourth door operating motor to rotate in the door closing direction.

9. A disposal system as set forth in claim 8, wherein said selective discharge means control circuit includes selective disabling means connected therein to prevent energizing said first, second and third door operating motors when said fourth discharge door is open, to prevent energizing said first, second and fourth door operating motors when said third discharge door is open, to prevent energizing said first, third and fourth door operating motors when said second discharge door is open, and to prevent energizing said second, third and fourth door operating motor when said first discharge door is open.

10. A disposal system as set forth in claim 8, wherein said disposal system is installed in a building having a plurality of stories, wherein said first switch means includes a corresponding plurality of first switch operators to operate said first switch means between its said first and second switch positions, one of which is located on each of said plurality of stories, said second switch means includes a corresponding plurality of second switch operators to operate said second switch means between its first and second switch positions, one of which is located on each of said plurality of stories, said third switch means includes a corresponding plurality of third switch operators to operate said third switch means between its said first and second switch positions, a one of which is located on each of said plurality of stories, said fourth switch means includes a corresponding plurality of fourth switch operators to operate said fourth switch means between its said first and second switch positions, a one of which is located on each of said plurality of stories.

11. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said movable discharge means at said lower end of said chute includes a rotatable spout, a spout rotating mechanism to rotate said spout between said first discharge position and said second discharge position, a spout rotating motor to power said spout rotating mechanism, a selective spout control circuit, spout control switch means connected in said selective spout control circuit operable between a first switch position to energize said spout rotating motor to rotate in the direction which rotates said spout into its said first discharge position for discharge of garbage into said first disposal receiving chamber and a second switch position to energize said spout rotating motor to rotate in the direction which rotates said spout into its said second discharge position for discharge of recyclable materials into said second disposal receiving chamber for conveying downstream toward said selective discharge means for selective discharge into a selected one of said plurality of disposal receptacles.

12. A disposal system as set forth in claim 11, wherein said disposal system is installed in a building having a plurality of stories, wherein said spout control switch means includes a corresponding plurality of spout control switch operators to operate said spout control switch means between its said first and second switch positions, one of which is located on each of said plurality of stories.

13. A disposal system as set forth in claim 12, wherein said selective spout control circuit includes override means connected therein to prevent a person on one of said stories from switching said spout control switch means to its said second switch position for discharge into said second disposal receiving chamber and activating said conveyor means and said selective discharge means while a person on a different floor has switched said spout control switch means to its said first switch position rotating said spout to its first discharge position for discharge of garbage into said first disposal receiving chamber.

14. A disposal system as set forth in claim 12, wherein said selective spout control circuit includes override means connected therein to switch said spout control switch means to its said first switch position for discharge into said first disposal receiving chamber intended for garbage in the event a first person on one floor so operates said spout control switch means and then disposes of garbage even though a second person on a different floor may also be using said disposal system by having previously switched the said spout control switch means to its said second switch position for discharge of recyclable materials into said second disposal receiving chamber and may be continuing to dispose of recyclable material from said different floor, such garbage being disposed of by said first person and such recyclable material being simultaneously disposed of by said second person both being discharged into said first disposal receiving chamber intended for garbage, such override means thereby preventing any disposal material which includes garbage from being inadvertently discharged into said second disposal receiving chamber intended for recyclable materials.

15. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said end wall at said downstream end of said elongated housing is an open end wall.

16. A disposal system to receive disposable items and separate them into a plurality of different categories for discharge into a corresponding plurality of disposal receptacles, comprising an upwardly extending chute having an upper end and a lower end, entrance aperture means opening to said chute above its said lower end and below its said upper end to receive disposable items therein for disposal, movable discharge means at said lower end of said chute movable to direct discharge of disposal items into a first disposal receiving chamber when moved to a first discharge position and into a second disposal receiving chamber when moved to a second discharge position, including said first and second disposal receiving chambers, an elongated housing having said second disposal receiving chamber position at the upstream end thereof, an elongated conveyor cavity extending in said elongated housing in communicating with said second disposal receiving chamber at the said upstream end thereof and terminating in an end wall at the downstream end thereof, conveyor means positioned relative to said elongated conveyor cavity and said second disposal receiving chamber to receive disposal items discharged into said second disposal receiving chamber and convey them from said upstream end of said elongated housing in the direction toward said downstream end thereof, said elongated housing including selective discharge means between its said upstream and downstream ends to selectively discharge a plurality of different kinds of disposal items into respective ones of a corresponding plurality of disposal receptacles, wherein said conveyor means includes an endless conveyor belt positioned below said elongated conveyor cavity of said elongated housing, said conveyor belt extending between a drive roller and a free wheeling roller and having an upper conveying portion for movement thereof in the direction from said upstream end of said housing toward said downstream thereof and having a lower return portion for return movement in the opposite direction when driven by said drive roller, and a conveyor drive motor connected to rotate said drive roller and move said endless conveyor belt in the said direction.

* * * * *